United States Patent
Liu et al.

(10) Patent No.: US 8,542,927 B2
(45) Date of Patent: Sep. 24, 2013

(54) CHARACTER AUTO-COMPLETION FOR ONLINE EAST ASIAN HANDWRITING INPUT

(75) Inventors: Peng Liu, Beijing (CN); Lei Ma, Beijing (CN); Frank Kao-Ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1149 days.

(21) Appl. No.: 12/146,874

(22) Filed: Jun. 26, 2008

(65) Prior Publication Data

US 2009/0324082 A1 Dec. 31, 2009

(51) Int. Cl.
*G06K 9/18* (2006.01)

(52) U.S. Cl.
USPC ........... 382/185; 382/187; 382/224; 382/190; 382/225; 382/226; 345/179

(58) Field of Classification Search
USPC .......... 382/185, 187, 190, 224–231; 345/179
See application file for complete search history.

(56) References Cited

U.S. PATENT DOCUMENTS

| | | | |
|---|---|---|---|
| 5,459,809 A | 10/1995 | Kim et al. | |
| 5,835,635 A | 11/1998 | Nozaki et al. | |
| 6,377,965 B1 | 4/2002 | Hachamovitch et al. | |
| 6,556,712 B1* | 4/2003 | Loudon et al. | 382/187 |
| 7,149,550 B2 | 12/2006 | Kraft et al. | |
| 7,171,353 B2 | 1/2007 | Trower, II et al. | |
| 7,293,231 B1 | 11/2007 | Gunn et al. | |
| 2005/0131686 A1* | 6/2005 | Yamamoto et al. | 704/231 |
| 2006/0256139 A1 | 11/2006 | Gikandi | |
| 2006/0265668 A1 | 11/2006 | Rainisto | |
| 2006/0294462 A1 | 12/2006 | Blair et al. | |
| 2007/0100619 A1 | 5/2007 | Purho | |
| 2007/0296615 A1 | 12/2007 | Raguseo | |

OTHER PUBLICATIONS

"Dynamic Programming Search for Continuous Speech Recognition", IEEE, Sep. 1999, pp. 64-83.
Hui, et al., "Joint Interpretation of Input Speech and Pen Gestures for Multimodal Human-Computer Interaction", pp. 1-4.
Hyvonen, et al., "Semantic Autocompletion", pp. 1-13.
Liu, et al., "Online Recognition of Chinese Characters: The State-of-the-Art", IEEE, vol. 26, No. 2, Feb. 2005, pp. 198-213.
Liu, et al., "Word Graph Based Speech Recognition Error Correction by Handwriting Input", ACM, 2006, pp. 339-346.
Lo, et al., "Generalized Posterior Probability for Minimizing Verification Errors at Subword, Word and Sentence Levels", IEEE, 2004, pp. 13-16.

(Continued)

*Primary Examiner* — Kim Vu
*Assistant Examiner* — Ruiping Li
(74) *Attorney, Agent, or Firm* — Lee & Hayes, PLLC (57) ABSTRACT

An exemplary method includes receiving stroke information for a partially written East Asian character, the East Asian character representable by one or more radicals; based on the stroke information, selecting a radical on a prefix tree wherein the prefix tree branches to East Asian characters as end states; identifying one or more East Asian characters as end states that correspond to the selected radical for the partially written East Asian character; and receiving user input to verify that one of the identified one or more East Asian characters is the end state for the partially written East Asian character. In such a method, the selection of a radical can occur using radical-based hidden Markov models. Various other exemplary methods, devices, systems, etc., are also disclosed.

20 Claims, 8 Drawing Sheets

(56) References Cited

OTHER PUBLICATIONS

Okamotoa, et al., "Direction-Change Features of Imaginary Strokes for Online Handwriting Character Recognition", pp. 1-5.

Tokuda, et al., "Multi-Space Probability Distribution HMM", IEICE, vol. E85-D, No. 3, Mar. 2002, pp. 455-464.

Watanabe, et al., "Semi-Synchronous Speech and Pen Input", IEEE, 2007, pp. IV-409-IV-412.

Williamson, et al., "Dynamics and Probabilistic Text Entry", Jun. 11, 2003, pp. 1-11.

Zhou, et al., "Improved Chinese Character Input by Merging Speech and Handwriting Recognition Hypotheses,", IEEE, 2006, pp. I-609-I-612.

* cited by examiner

EXEMPLARY CAC ALGORITHM 400

| for $t = 1$ to $T$ | 410 |
|---|---|
| Intra-radical: for each active radical $\mathcal{R}$     420 ||
| for each active state $s$ in $\mathcal{R}$ ||
| for each $s'$ succeeding $s$ ||
| $Q(o_1^{t-1}, s) \rightarrow Q(o_1^t, s')$ <br> $S(o_1^t \vert \mathcal{R}) = \max(S(o_1^t \vert \mathcal{R}), Q(o_1^t, s'))$ ||
| Inter-radical: for each active radical $\mathcal{R}$ (with ending state $s$)     430 ||
| for each $\mathcal{R}'$ succeeding $\mathcal{R}$ ||
| for each entry state $s'$ in $\mathcal{R}'$ ||
| $Q(o_1^t, s) \rightarrow Q(o_1^t, s')$ ||
| Predict results: for each active radical $\mathcal{R}$     440 ||
| for each $C$ with index between $S_\mathcal{R}$ and $E_\mathcal{R}$ ||
| $S(o_1^t \vert \mathcal{H}_C) = \max(S(o_1^t \vert \mathcal{H}_C), S(o_1^t \vert \mathcal{R}))$ ||
| Generate CAC N-best based on $S(o_1^t \vert \mathcal{H}_C)$ ||

TABLE 700: EXEMPLARY TRIAL RESULTS

| Percentage(%) | 10 | 20 | 30 | 40 | 50 | 60 | 70 | 80 | 90 | 100 |
|---|---|---|---|---|---|---|---|---|---|---|
| speech | | | | | 66.11/87.06 | | | | | |
| handwriting recognition | 0.02/ 0.03 | 0.02/ 0.03 | 0.02/ 0.03 | 0.03/ 0.05 | 0.06/ 0.31 | 0.28/ 2.16 | 1.90/ 8.70 | 13.26/ 44.57 | 53.26/ 79.11 | 91.84/ 97.39 |
| handwriting CAC | 0.42/ 3.80 | 1.83/ 12.12 | 5.20/ 25.98 | 12.08/ 44.81 | 24.18/ 64.40 | 39.84/ 78.67 | 56.67/ 87.76 | 71.65/ 92.80 | 82.15/ 95.15 | 86.37/ 95.91 |
| CAC + speech | 17.89/ 64.68 | 31.72/ 78.32 | 45.49/ 85.28 | 55.82/ 88.42 | 65.15/ 90.89 | 73.22/ 92.94 | 79.03/ 94.41 | 83.43/ 95.58 | 86.25/ 96.32 | 87.41/ 96.85 |

CHARACTER AUTO-COMPLETION FOR ONLINE EAST ASIAN HANDWRITING INPUT

BACKGROUND

In recent years, natural user interfaces for natural inputs like speech and handwriting have become more popular. These interfaces rely on recognition technologies, typically those that recognize patterns in speech or handwriting. Speech input tends to be efficient but not very robust against noise or other adverse environmental noise conditions. On the other hand, handwriting input is slower but more reliable. With respect to East Asian characters (e.g., Chinese characters), many characters have similar pronunciations, which can confound recognition and impact reliability. As for handwriting, many East Asian characters are too complicated to be written rapidly. For such reasons, attempts have been made to develop bi-modal (handwriting and speech) input systems for East Asian characters that can build off the strengths of each approach.

Various exemplary techniques discussed herein rely on handwriting as input or a combination of handwriting and speech as inputs. Such techniques allow for reliable and efficient character recognition.

SUMMARY

An exemplary method includes receiving stroke information for a partially written East Asian character, the East Asian character representable by one or more radicals; based on the stroke information, selecting a radical on a prefix tree wherein the prefix tree branches to East Asian characters as end states; identifying one or more East Asian characters as end states that correspond to the selected radical for the partially written East Asian character; and receiving user input to verify that one of the identified one or more East Asian characters is the end state for the partially written East Asian character. In such a method, the selection of a radical can occur using radical-based hidden Markov models (HMMs). Various other exemplary methods, devices, systems, etc., are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various exemplary techniques described herein pertain to character recognition and auto-completion of characters. For example, an exemplary technique relies on a prefix tree to expedite auto-completion of a partially written East Asian character. Such a prefix tree relies on an underlying structural hierarchy whereby a set of East Asian characters can be represented by a smaller set of radicals. For example, a radical set may include less than a thousand members while the set of East Asian characters that can be represented by the radical set may number in the thousands.

As described herein, a model or models may be used to select a radical based on stroke information. For example, radical-based hidden Markov models (HMMs) may be used to select one or more radicals as part of a modeling phase for character auto-completion. In turn, a prefix tree may be used in a decoding phase for character auto-completion. In various examples, radical score decomposition can occur in a manner whereby computation cost is proportional to the size of a prefix tree.

As explained below, radical-based HMMs can select one or more radicals based on stroke information such as slope and curvature. Further, radical-based HMMs may account for that fact that a character may be written using one of multiple stroke paths (e.g., one user may write a character using a learned stroke path and another user may write a character using a different, learned stroke path). Yet further, radical-based HMMs may rely on real stroke information and imaginary stroke information.

As described herein, an exemplary algorithm for handwriting can be integrated into an exemplary method for multi-modal character recognition, where an additional mode may include an input such as speech and a speech recognition algorithm.

Specifics of particular algorithms are described in more detail below, including those that rely on HMMs and pen trajectory data. A particular approach relies on slope and acceleration of handwriting. Such an approach can rely on a Multi-Space Probability Distribution (MSD) technique to model "imaginary" strokes jointly with real strokes.

As mentioned in the Background section, attempts have been made to form bi-modal systems for Chinese characters. As described herein, a remaining challenge is to predict meaningful character candidates based on partial online handwriting input. For example, when a user inputs a radical '冫', a system should be able to list out those characters that include the radical, such as '江', '河', and '湖', etc. In general, such a task is called character auto-completion (CAC). Various exemplary techniques focus on CAC as well as how such techniques may be implemented in a multi-modal system.

It is relatively easy to perform CAC by table look up assuming a character is written regularly in a stroke-by-stroke manner. However, often writers want to write naturally and not according to some rigid standard. For example, for cursive input, an online recognizer needs a decent pen trajectory statistical model to handle curved strokes. As discussed below, Hidden Markov Models (HMMs) can be used to completely characterize cursively written characters at a subcharacter or a radical level. The ability to handle such freely written characters facilitates implementation of a prefix tree based decoding algorithm.

An exemplary CAC mechanism is built upon an evolving prefix tree in a decoding process; such a mechanism can output CAC candidates with only marginal loss in efficiency.

Accordingly, such an algorithm can provide CAC results simultaneously with a user's input. Hence, the user can select a correct candidate from a list of identified candidates to accelerate character input. In a multi-modal extension, a user can say the character while writing it and a CAC list can be fused with speech recognition result(s) for a increased accuracy (e.g., a more accurate list and/or a smaller list).

The description that follows introduces a radical hierarchy for prefix tree based decoding and HMM pen trajectory modeling. An exemplary CAC algorithm based on a prefix tree is presented and then a fusion strategy of a bi-modal system is described. Results from trials for an exemplary recognizer and bi-modal input system, performed on a real database, are also presented.

Figure 1:
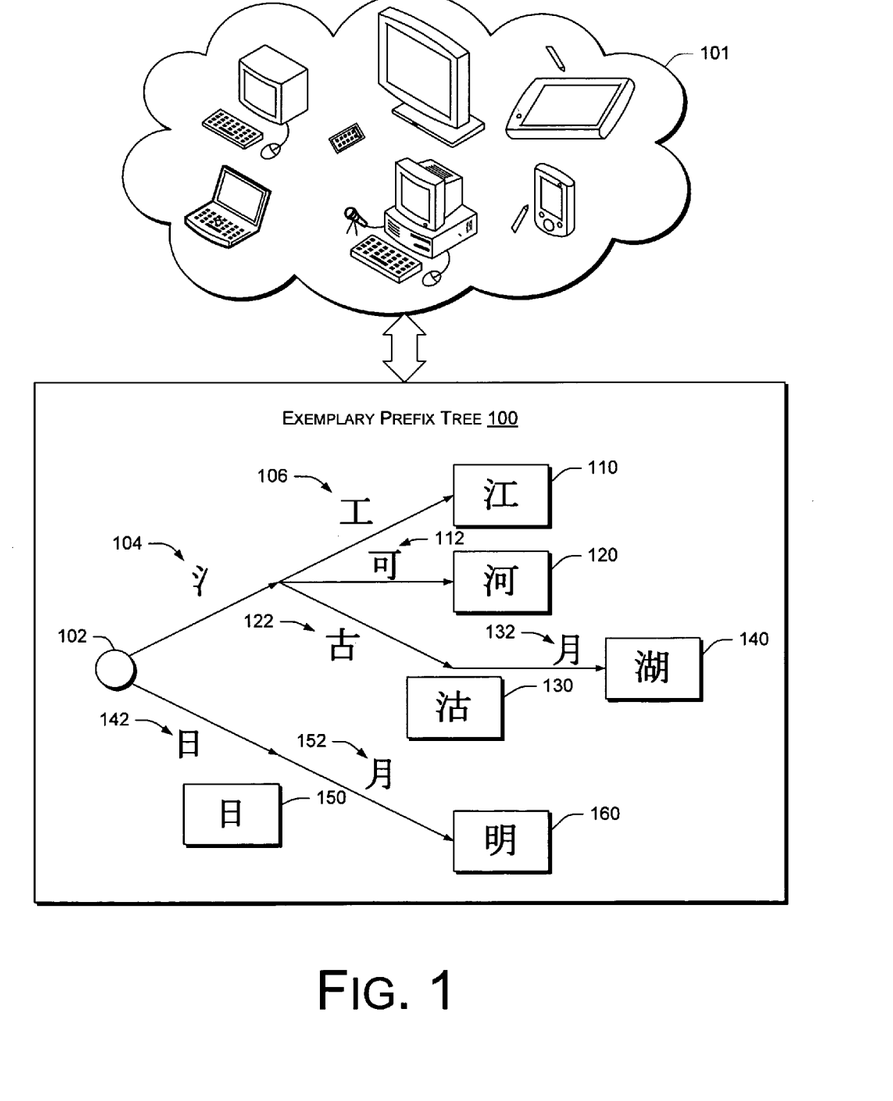
FIG. 1 is a diagram of equipment and an exemplary prefix tree for use in recognizing handwritten characters.

FIG. 1 shows a prefix tree 100 for radical based pen trajectory modeling along with various equipment 101, which may be used for input and/or modeling. With respect to the equipment 101, as shown, various computing devices can be equipped with any of a variety of input features. For example, input can occur via a keyboard, a pen, a mouse, a microphone, a remote control, a cell phone keypad, etc. As described further below, input may be bi-modal, for example, input may include drawing at least part of a character as well as pronouncing at least part of a character.

The prefix tree 100 considers a Chinese character as being formed in a complex but rather hierarchical manner. As such, the complexity of a Chinese character can be represented according to a structural hierarchy. The prefix tree 100 represents a structural hierarchy for some Chinese characters. As described herein, a prefix tree or prefix trees can be constructed to provide a structural hierarchy for many, if not all, Chinese characters.

Radicals or sub-character roots are commonly used as the basic semantic or phonetic construction units. The use of radicals has some analogy to speech in that a word can be decomposed into one or several sub-word units, e.g. phones. With an appropriate set of radicals, it is possible to represent all Chinese characters. Thus, the use of radicals makes the problem of modeling all Chinese characters more tractable, especially when the number of radicals in the radical set is much less than the number of Chinese characters (e.g., a couple of hundred radicals for several thousand characters). In essence, the radical approach provides "common denominators" that serve as building blocks while a prefix tree provides logic for how these blocks are assembled. Overall, such a radical and prefix tree approach expeditiously narrows the group of possible Chinese characters as the building blocks are provided or assembled (e.g., as a person writes a Chinese character).

More specifically, once a radical set is determined, the whole radical hierarchy of all the characters can be described in a tree lexicon as illustrated in FIG. 1. As described herein, conventional decoding algorithms for speech recognition can be applied in a rather direct manner to arrive at a character. To further improve efficiency of such an approach, beam searching and histogram pruning can be used in a decoding process. An exemplary approach forms a natural basis for an efficient character auto-completion (CAC) algorithm.

While radical-based modeling and decoding may rely solely on written or semantic aspects of a character, as described herein, an exemplary approach may also consider phonetic aspects. For example, a radical or radicals may form a phone that can be spoken by a user or audibly generated by a computing device.

Specifically, a structure may be used that is similar to speech whereby a word can be decomposed into one or several sub-word units, e.g. phones. Again, with a set of radicals, all Chinese characters can be represented in a hierarchical manner (see, e.g., the prefix tree of FIG. 1). As mentioned, once a radical set is determined, the whole radical hierarchy of all the characters can be described in a tree lexicon and, for example, conventional decoding algorithms for speech recognition can be directly applied to the CAC problem, regardless of whether a character is represented by semantic, phonetic or semantic and phonetic structures or subunits.

Referring again to the prefix tree 100 of FIG. 1, this tree includes the following Chinese characters: water 102, work 104 (gong), river 110 (jiang), OK 112 (ke, mouth and consenting), river 120 (he), "ten mouths" 122 (gu, ten and mouth), 130, moon 132 (yue), lake 140 (hu, water and phonetic of gu and yue), sun 142 (ri), sun 150 (ri), moon 152, and bright 160 (ming, sun and moon).

In the example of FIG. 1, the prefix tree 100 includes various radicals that form the Chinese characters 110, 120, 130, 140, 150 and 160, which are in boxes and end states. For example, the radical 102 for water appears in the Chinese characters 110, 120, 140 and 140. In instances where a person pens the radical 102, then the prefix tree 100 is used by a CAC algorithm to narrow the possible Chinese characters to corresponding branches of the prefix tree 100.

As described herein, exemplary techniques for character auto-completion (CAC) can predict Chinese characters with partial, cursive handwriting as input using a prefix tree decoder-based CAC algorithm. In various examples, radical-based hidden Markov models provide for pen trajectory modeling and identifying radical structure of Chinese characters. In various examples, high quality character candidates can be efficiently predicted even without finishing strokes of a Chinese character. As a result, significant improvement in recognition throughput can be obtained.

As discussed further below, handwriting CAC can be combined with speech recognition candidates, in the posterior sense, to thereby provide a flexible, rapid bi-modal Chinese character input system. Trials performed on a large Chinese corpus demonstrated that more than 90% of input attempts could be correctly finished with only writing about 50% of a whole character's trajectory.

Figure 2:
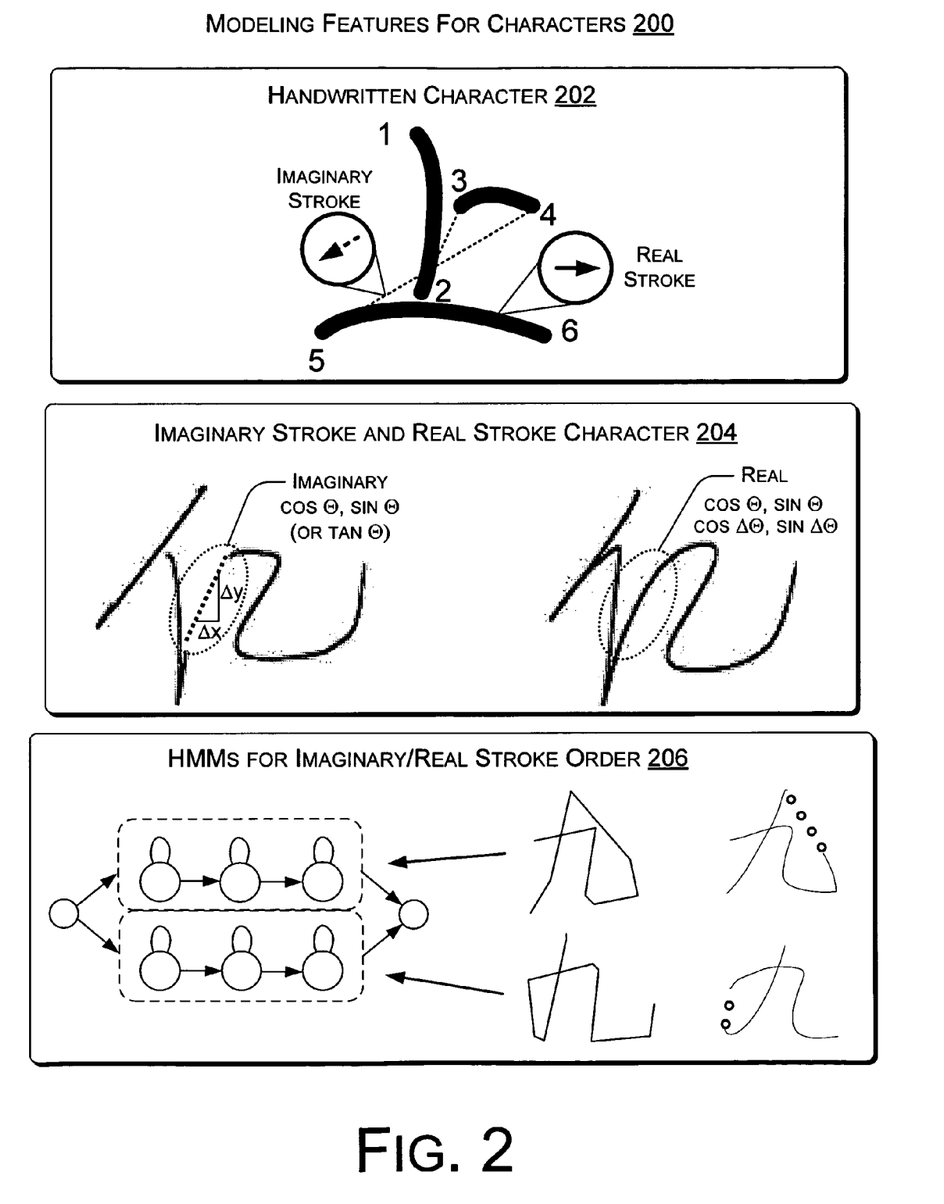
FIG. 2 is a diagram of an East Asian character along with indications of strokes, order of strokes and associated information that may be used in a Hidden Markov Model.

FIG. 2 shows some modeling features for characters 200, particularly for East Asian (EA) characters. In FIG. 2, a handwritten EA character 202 is shown along with indications of strokes for beginning and end points (1-6) of each stroke. As indicated with respect to the character 202, a stroke may be a real stroke (e.g., an ink stroke) or an imaginary stroke. Beginning and end points of individual strokes are labeled from 1 to 6, according to an order in which an individual drew the character. Timings may be acquired (e.g., in milliseconds) for each of the points 1 through 6 along with Cartesian coordinates (x, y) or other coordinates. Consider a writer that started a first real stroke at point 1, which is accorded a time of 0 ms, and ended the first stroke at point 2 at a time of 20 ms. Next consider the writer starting a second real stroke at point 3 at a time of 36 ms and ending at point 4 at a time of 48 ms. Finally, consider a final real stroke starting at point 5 at a time of 71 ms and ending at point 6 at a time of 95 ms. Where a sampling rate of 100 Hz is used, the smallest time increment would be 10 ms, hence, the time information may be rounded (e.g., 0 ms, 20 ms, 40 ms, 50 ms, 70 ms, 100 ms). Such time sequential information allows for speed, velocity and acceleration determinations for a stroke.

Another block 204 in FIG. 2 shows an example of a character with an imaginary stroke and an example of the same character with a real stroke. The examples of block 204 illustrate use of slope and curvature. Such characteristics pertain to trajectory and can be used by a CAC algorithm. For example, an exemplary CAC algorithm may use a trajectory approach that represents imaginary strokes using slope and represent real strokes using higher dimensional information such as curvature.

In the example of block 204 of FIG. 2, the imaginary stroke is represented as a straight dashed line with slope but without curvature, as indicated by the $\Delta x$ and $\Delta y$ distances and the cosine and sine function (or by a tangent function). In contrast to the imaginary stroke, the real stroke is not straight but curved; thus, the features $\cos \Delta \Theta$ and $\sine \Delta \Theta$ may be used in addition to the slope features for a real stroke, whether the real stroke is a fundamental part of a character (e.g., skeletal component), a connecting stroke (e.g., cursive) or a style element (e.g., calligraphic element). As described herein, for a handwriting generation system, slope features can be estimated for imaginary strokes while slope and curvature features can be estimated for real strokes.

The aforementioned trajectory approach can, in some instances, cause confusion among characters with similar but actually different trajectories. To overcome such issues, an exemplary Multi-Space Probability Distribution (MSD) technique can be implemented to model imaginary strokes jointly with real strokes. For example, considering the two Chinese radicals '氵 (water)' and '讠 (speech)', if all real strokes are connected, the trajectories of the two radicals then become indistinguishable. In addition to the pen trajectory, a binary indicator to encode connection/no-connection between successive real strokes can be useful to differentiate real from imaginary strokes. As already mentioned with respect to the character 204, another issue in imaginary stroke modeling occurs for direct connection of two successive real strokes where features like curvatures are degenerated (such imaginary strokes have zero variance).

Using the MSD technique, real and imaginary strokes become observations from different probability spaces that can be modeled stochastically. Also, the flexibility in the MSD technique, to assign different feature dimensions to each individual space, allows a recognition system to ignore certain features that can cause singularity issues in modeling. For purposes of character recognition, experimental results obtained in handwritten Chinese character recognition indicate that the MSD approach provides about a 1.3%-2.8% character recognition accuracy improvement across different recognition systems where MSD significantly improves discrimination among confusable characters with similar trajectories. As described herein, such an approach can be applied to an HMM based model for CAC.

By adding imaginary strokes and appropriate MSD modeling, discrimination among characters of similar trajectories is enhanced. For example, in traditional HMM approaches, discrimination among the radicals of '氵' and '讠' can lack accuracy while with a MSD-HMM approach, discrimination is more accurate. The overall improvement achieved by using a MSD-HMM approach is effective in alleviating issues caused by simply connecting real strokes with imaginary ones.

An MSD-HMM approach can rely on a four dimensional feature set ($\cos \Theta$; $\sin \Theta$; $\cos \Delta \Theta$; $\sin \Delta \Theta$) and optionally a lesser dimensional feature set for imaginary strokes, for example, a two dimensional feature set ($\cos \Theta$; $\sin \Theta$). The latter approach eliminates the possibility of a curvature singularity for imaginary strokes while preserving rich stroke information for real strokes. In other words, via such a feature arrangement, non-stochastic, degenerated information of curvature information in imaginary strokes is discarded, and pen trajectories can be modeled more efficiently.

FIG. 2 also shows a block 206 that includes a diagram of HMMs corresponding to imaginary/real stroke order 206. In the HMM diagram an upper path and a lower path represent two possible imaginary strokes for a character. The character is shown in the block 206 where circles represent imaginary strokes and solid lines represent real strokes. Whether a handwritten character is written in one manner or the other is captured via ink sequence data. As indicated in the block 206, the writer may write a character using a standard order (e.g., as taught in school) or an alternative order (e.g., personal or other). To capture such information, an exemplary HMM based CAC system includes HMMs for both possibilities. Of course where more than two possibilities exist, a system can include more than two possibilities.

The approach illustrated in the block 206 is referred to as a multi-path HMM approach. In conventional online handwriting modeling, the HMM topology is left-to-right, and only capable of characterizing a specific kind of pen trajectory. An exemplary multi-path HMM approach accounts for variances in writing orders and writing styles. Such an approach can effectively model pen trajectories. Various examples described herein rely on a radical-based HMM pen trajectory modeling approach.

Given a structure of radical HMMs in a multi-path way, expectation-maximization (EM) training can automatically summarize major modes of trajectory from training data. For example, as explained in with respect to the block 206 of FIG. 2, the radical '九' has two writing orders, and a two-path HMM can automatically learn these two writing sequences.

With respect to MSD modeling, the observation space $\Omega$ can be considered as a union of several sub-spaces: $\Omega = \bigcup_{g=1}^{G} \Omega_g$, where $\Omega_g$ is a $n_g$-dimensional sub-space $\mathbb{R}^{n_g}$, specified by index g, and G is the total number of sub-spaces. Each sub-space $\Omega_g$ has its probability $\omega_g$, where $\Sigma_{g=1}^{G} \omega_g = 1$. Correspondingly, the output probability is defined as the summation of observed probability in each sub-space: $b(o) = \Sigma_{o \in \Omega_g} \omega_g P_g(o)$, where $o \in \Omega_g$ means that o can be observed in $\Omega_g$.

In pen trajectory modeling, the sample space $\Omega$ consists of a real sub-space $\Omega_R$ and an imaginary sub-space $\Omega_I$. Then the output distribution is represented as $b(o) = \omega_R P_R(x)$ if $o \in \Omega_R$ and $b(o) = \omega_I P_I(x)$ if $o \in \Omega_I$ (Eqn. 1).

Figure 3:
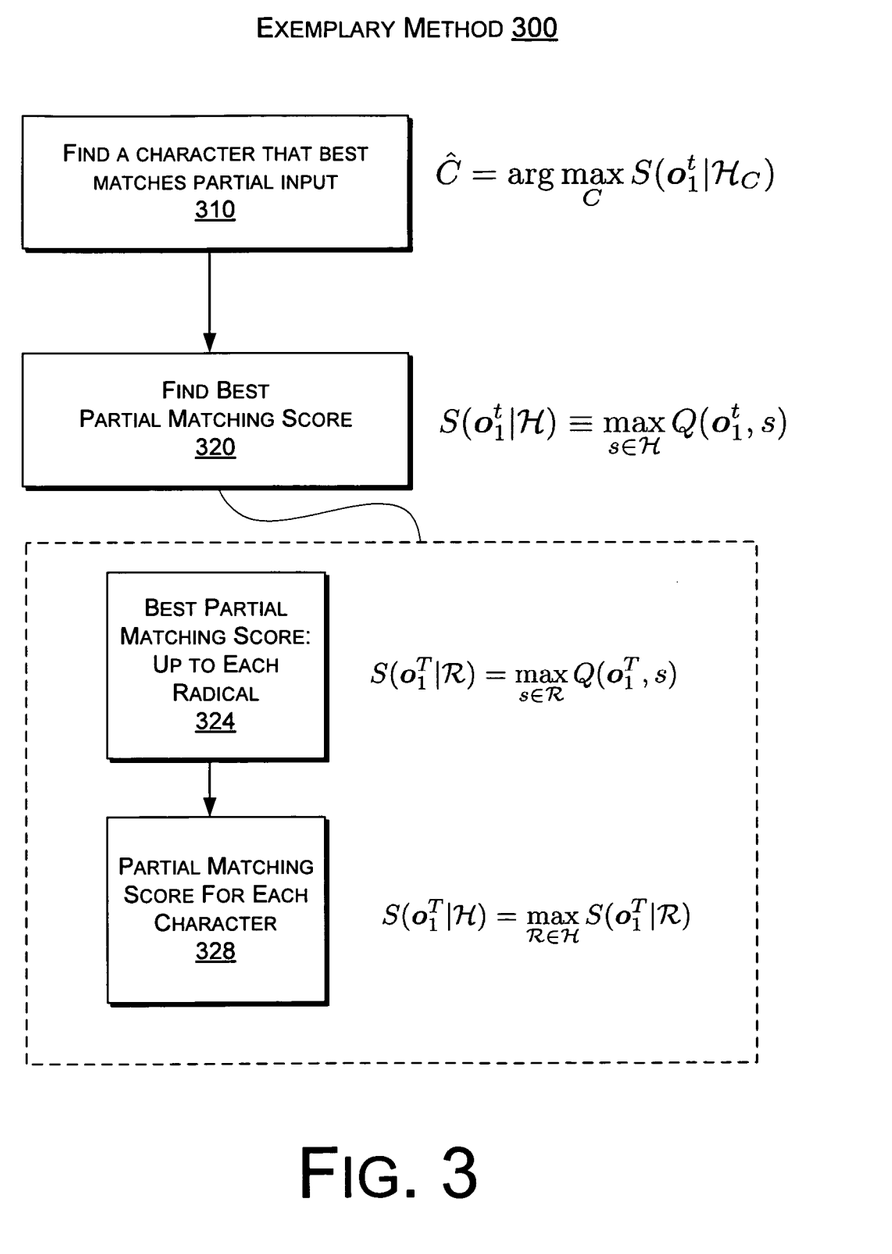
FIG. 3 is a diagram of an exemplary method for recognizing handwritten characters.

FIG. 3 shows an exemplary method 300 for a CAC problem. A CAC problem can be described as: "Given a pen trajectory, how to predict those characters that can partially best match it?" Per block 310 of the method 300, this problem can be formulated as (Eqn. 2): $\hat{C} = \mathrm{argmax}_C S(o_1^t, \mathcal{H}_C)$, where $o_1^t$ is the observation sequence corresponding to the input trajectory piece, and S represents the best partial matching score between the input observation sequence and the composite HMM $\mathcal{H}_C$ corresponding to the character C. Usually, the n-best is desired instead of the top candidate as the output of the CAC because of uncertainty. Per block 320 of the method 300, the best partial matching score can be defined as (Eqn. 3): $S(o_1^t, \mathcal{H}_C) \equiv \max_{s \in \mathcal{H}_C} Q(o_1^t, s)$, where $Q(o_1^t, s)$ denotes the score of best path up to time t that ends in state s, which is the variable decoding score.

Direct calculation of Eqn. 3 can be exhaustive and hence an exemplary approach includes block 324 and 328 to reduce this demand. This approach makes use of the radical hierarchy, which significantly reduces the search cost in solving Eqn. 2 (see block 310). Note that in each radical, only the best score can survive when searching a global CAC result.

As described herein, an exemplary approach decomposes the CAC problem to a radical level. First, per block 324, calculation of the best partial matching score up to each radical R in the prefix tree occurs (Eqn. 4): $S(o_1^T \mathcal{R}) = \max_{s \in \mathcal{R}} Q(o_1^T, s)$. Then, per block 328, one obtains the partial matching score for each character (Eqn. 5): $S(o_1^T \mathcal{H}) = \max \mathcal{R}_\epsilon \mathcal{H} Q(o_1^T, \mathcal{R})$.

The two-step algorithm of block 324 (Eqn. 4) and block 325 (Eqn. 5) can efficiently meet the calculation of block 320 (Eqn. 3). The first step of block 324 (Eqn. 4) can be treated as a pre-processing for the whole character set, where the computational cost is in proportional to the size of the prefix tree, while in the second step of block 328 (Eqn. 5), the computational cost is reduced to be proportional to the average number of radicals in the character.

In practice, one can only calculate the partial path scores for those paths which survive the beam search pruning. Hence, in implementing Eqn. 5, one can visit each active radical and then propagate the score to all its descendants in the prefix tree, defined as those characters going through it (e.g., in the tree shown in FIG. 1, the descendant set of the radical '氵' is {江, 河, '湖', 沽}). It can be cumbersome when the size of the descendant set is too large to be handled in a real time decoding process, especially for those radicals close to the root of the tree. To alleviate this problem, an exemplary approach sorts all the leaf nodes, which represent output characters, by visiting the prefix tree in a depth first search (DFS). Note that in the DFS sorted character sequence, all the characters belonging to a descendant set can be arranged continuously. Hence, such an approach can represent the set by its starting and ending index (S$\mathcal{R}$, E$\mathcal{R}$).

Figure 4:
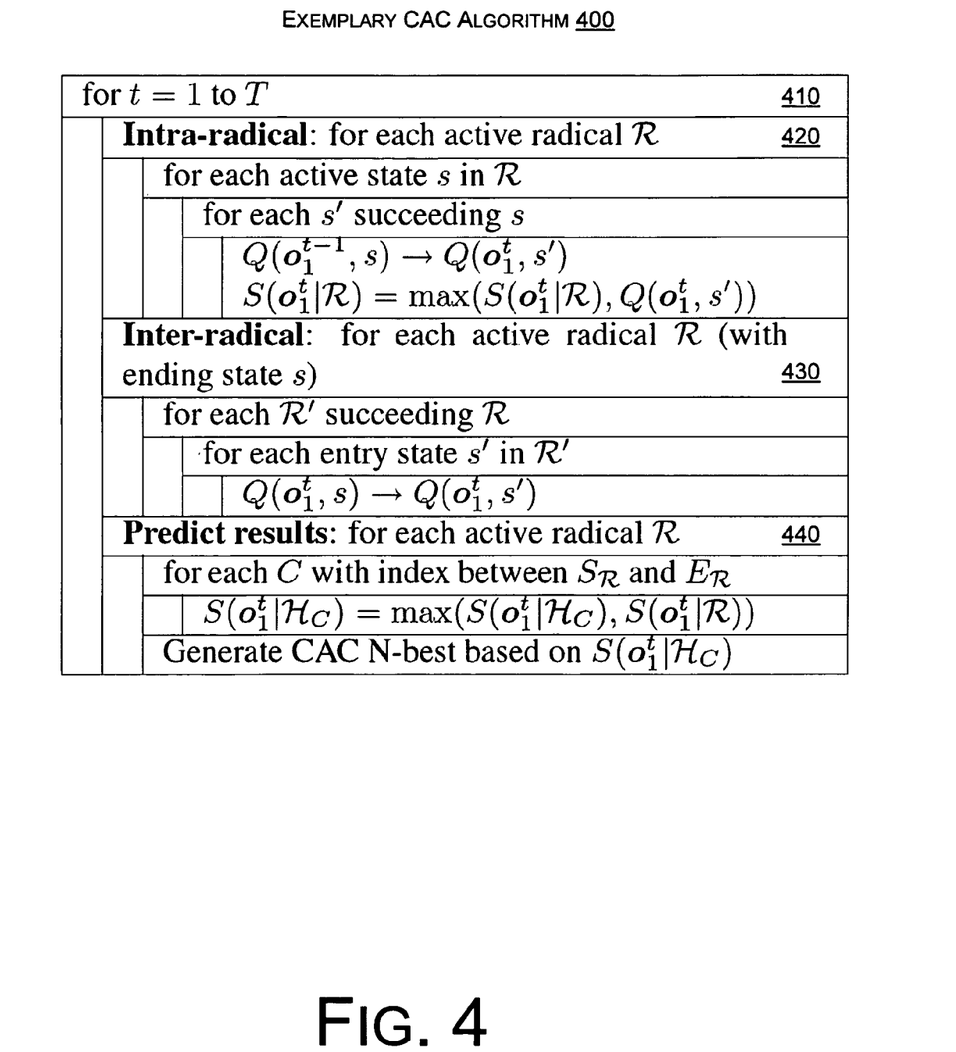
FIG. 4 is a diagram of an exemplary character auto-completion algorithm (CAC) for handwritten characters.

FIG. 4 shows a flowchart of an exemplary CAC algorithm 400, which may be optionally implemented in a conventional decoder with a marginal increase of its computational cost. The top candidates of the algorithm output are those predicted results (e.g., assuming that a character is yet to be finished). The CAC results make the combination with speech input feasible because the later is based on the speech of the whole character.

The algorithm 400 includes a main loop 410 from t=1 to T. Within the loop 410, are an intra-radical process 420, an inter-radical process 430 and a result prediction process 440. The intra-radical process 420 includes use of the Eqn. 4 (see also block 324 of FIG. 3) while the result prediction process 440 includes use of the Eqn. 5 (see also block 328 of FIG. 3).

As mentioned, an exemplary CAC algorithm may be implemented using bi-modal input (e.g., writing and speech). Such an approach is referred to at times as bi-modal fusion with CAC inputs. Posterior based recognizer fusion has been proven successful in various applications.

Figure 5:
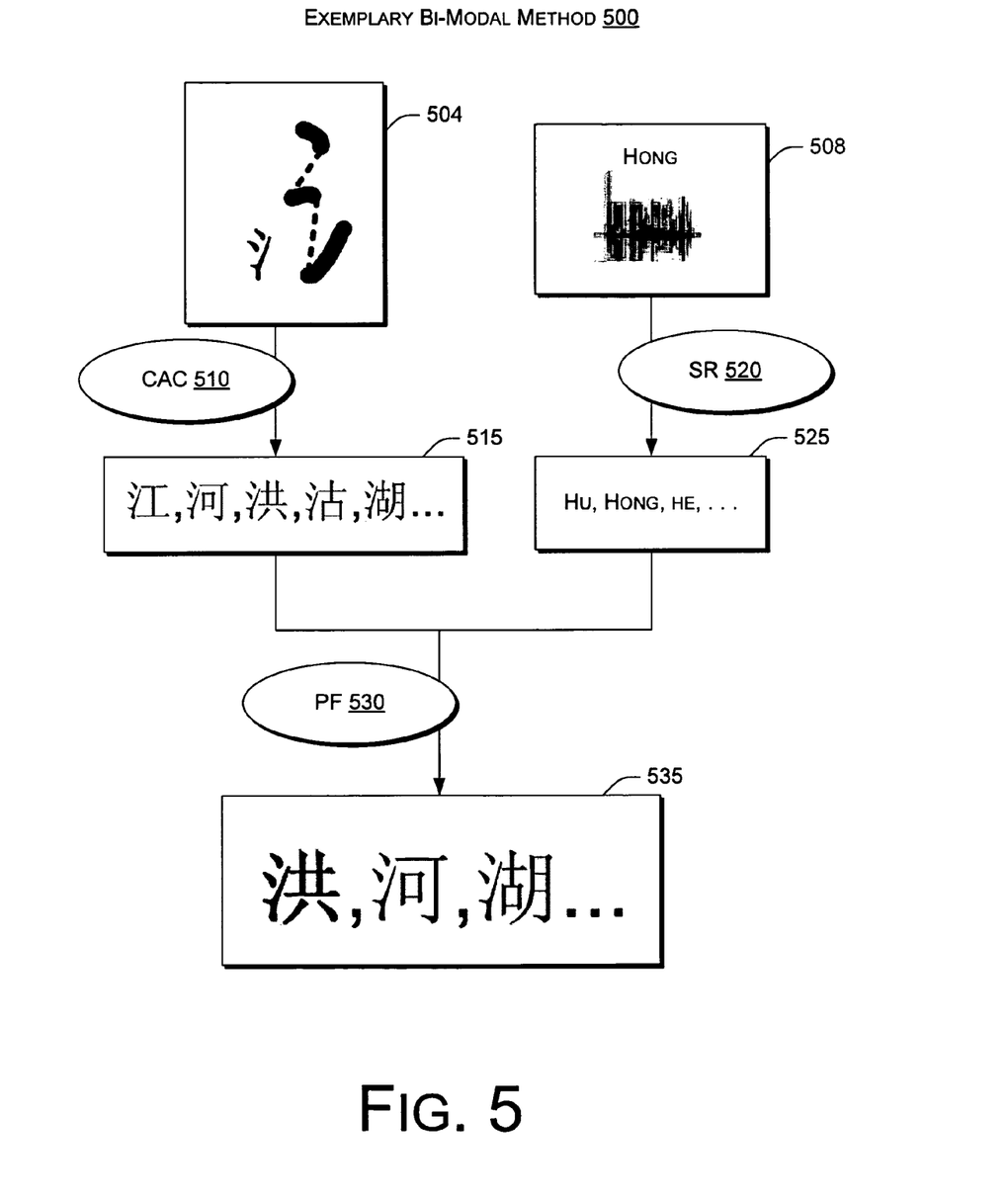
FIG. 5 is a diagram of an exemplary bi-modal method for recognizing handwritten characters based on handwriting and speech inputs.

FIG. 5 shows an exemplary bi-modal method 500. The method 500 includes ink data input 504 to a CAC algorithm 510 and audio data input 508 to a speech recognition (SR) algorithm 520. The CAC algorithm 510 outputs characters 515 and the SR algorithm 520 outputs phones. The outputs 515 and 525 are input to a posterior function (PF) 530 to particularly identify characters (output 535).

More specifically, given the candidate lists and corresponding scores from CAC and speech recognition, the fusion can be conducted as follows (Eqn. 6): $S(C) = P_S(C|o_S) \cdot P_H(C|o_H)$, where the subscripts "S" and "H" stand for speech and handwriting, respectively. According to the Bayesian rule, the generalized posterior term can be calculated as (Eqn. 7): $P(C|o) = P^\kappa(o|C)/\Sigma_C P^\kappa(C')$, where κ is a scaling factor to equalize raw candidate scores for a recognizer. In various trials, this factor was set to 0.1.

To evaluate an exemplary algorithm, trials were conducted on a bimodal, handwriting-speech database. The handwriting part was a large corpus of online Chinese handwritten characters collected on a Tablet PC. The training set contained a total of 4,772,310 samples of 9,119 in printed or cursive writing styles, and the test set was composed of 355,138 samples from the same 9,119 characters. The database covered most Chinese characters currently used today and it was collected from over 1,000 writers. The speech corpus was composed of 16,000 isolated syllable utterances collected from 160 speakers that covered all 408 isolated syllables in Chinese. In the handwriting modeling, 707 radicals were adopted and each of them was characterized by a 4-path MSD HMM. In the speech modeling, conventional tri-phone HMMs with GMM output distributions of 6 Gaussian kernels per state were used.

The system setup to verify the CAC algorithm and bimodal input followed the method 500 of FIG. 5. Both the direct output of the CAC (see block 515) and the bi-modal fusion results (see block 535) were evaluated. To simulate partial handwriting input, the percentage of handwriting sample points sent to the decoder was controlled to be less than 100%. In the bimodal fusion stage, the 500 top candidates from CAC and the 20 top candidates from a speech recognizer were input.

Figure 6:
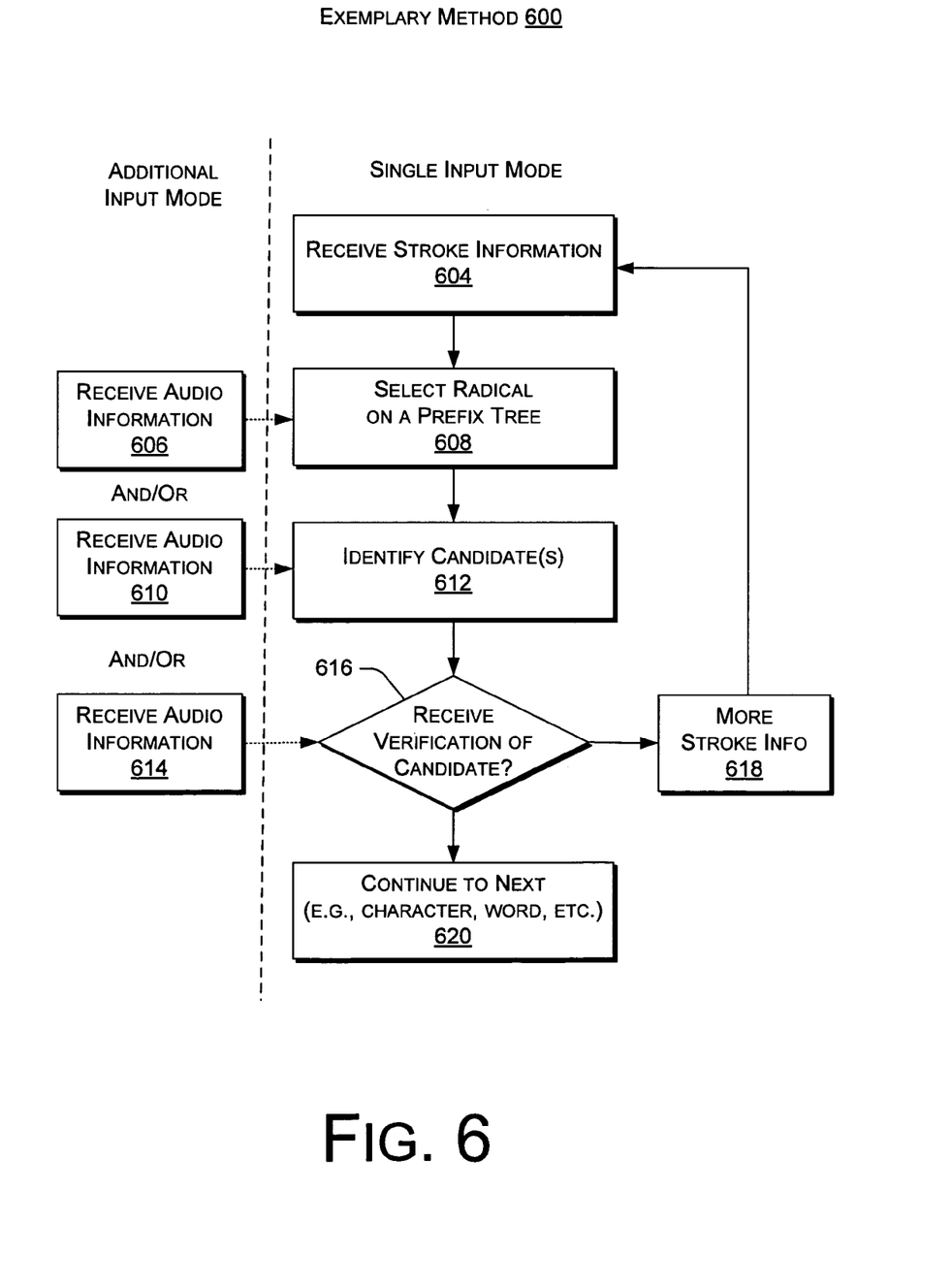
FIG. 6 is a diagram of an exemplary method for character auto-completion that optionally includes an additional input mode.

FIG. 6 shows an exemplary method 600 that receives stroke information and that has an optional additional input mode (e.g., for receiving audio information). The method 600 may be considered as having two phases: a modeling phase and a decoding phase. The modeling phase can include use of radical-based hidden Markov models (HMMs) to select a radical (or radicals) based on stroke information. The decoding phase can include use of a prefix tree that includes radicals and that includes characters as end states.

In the example of FIG. 6, the method 600 commences in a reception block 604 that receives stroke information, for example, for a partially written East Asian character that can be represented by one or more radicals. A selection block 608, based at least in part on the stroke information, selects a radical on a prefix tree (see, e.g., the tree 100 of FIG. 1); noting that a radical may be a character. As mentioned, such a selection can occur using radical-based HMMs.

As explained with respect to FIG. 1, a prefix tree includes various states, including end states that represent a character or a compound character (e.g., typically a character formed from multiple radicals). For example, in some instances two individual characters (each of which may be a radical) have a particular meaning when combined such as the end state "bright" 160 of the prefix tree 100, which is formed from the character for sun 142 and the character for moon 152.

After selection of a radical on a prefix tree, the method 600 continues in an identification block 612 that identifies one or more candidates for the partially written character. In general, an identified candidate is an end state of a prefix tree; noting that an end state may be an intermediate leaf (e.g., consider ends states 140 and 150) or a terminal leaf (e.g., consider end states 110, 120, 140 and 160).

As explained, a computing device may present one or more candidates to a user via a user interface. Such a presentation may be a visual and/or an audible presentation. In the method 600, a decision block 616 decides whether a verification of a candidate has been received. For example, a user may verify a candidate via pressing a key, taping a screen, uttering a phone, uttering a number associated with a candidate, etc. If the decision block 616 decides that a candidate has been verified, then the method 600 proceeds to a continuation block 620. Otherwise, the method 600 proceeds to a more information block 618 that can return to the reception block 604 to receive more stroke information for the written character.

As mentioned, the method 600 may optionally receive audible input as an additional input mode. Various reception blocks 606, 610, 614 indicate possible points where audio information may be received to aid in auto-completion of a partially written character. For example, per the reception block 606, audio information may aid in selection of a radical; per the reception block 610, audio information may aid in identification of one or more candidates; and per the reception block 614, audio information may aid in deciding whether a candidate has been verified (e.g., audio information may be used to verify a candidate). Where input of audio information occurs, one or more speech recognition algorithms may assist the method 600 (see, e.g., the bi-modal method 500 of FIG. 5).

As described herein, an exemplary method (e.g., implemented by a computing device) includes receiving stroke information for a partially written East Asian character, the East Asian character representable by one or more radicals; based on the stroke information, selecting a radical on a prefix tree where the prefix tree branches to East Asian characters as end states; identifying one or more East Asian characters as end states that correspond to the selected radical for the partially written East Asian character; and receiving user input to verify that one of the identified one or more East Asian characters is the end state for the partially written East Asian character. Such a method may include displaying the identified one or more East Asian characters. Such a method may include imaginary and real stroke information and the selecting may include selecting based on the imaginary and real stroke information. As explained, such a method may be multi-modal and receive information via a mode such as audio.

Figure 7:
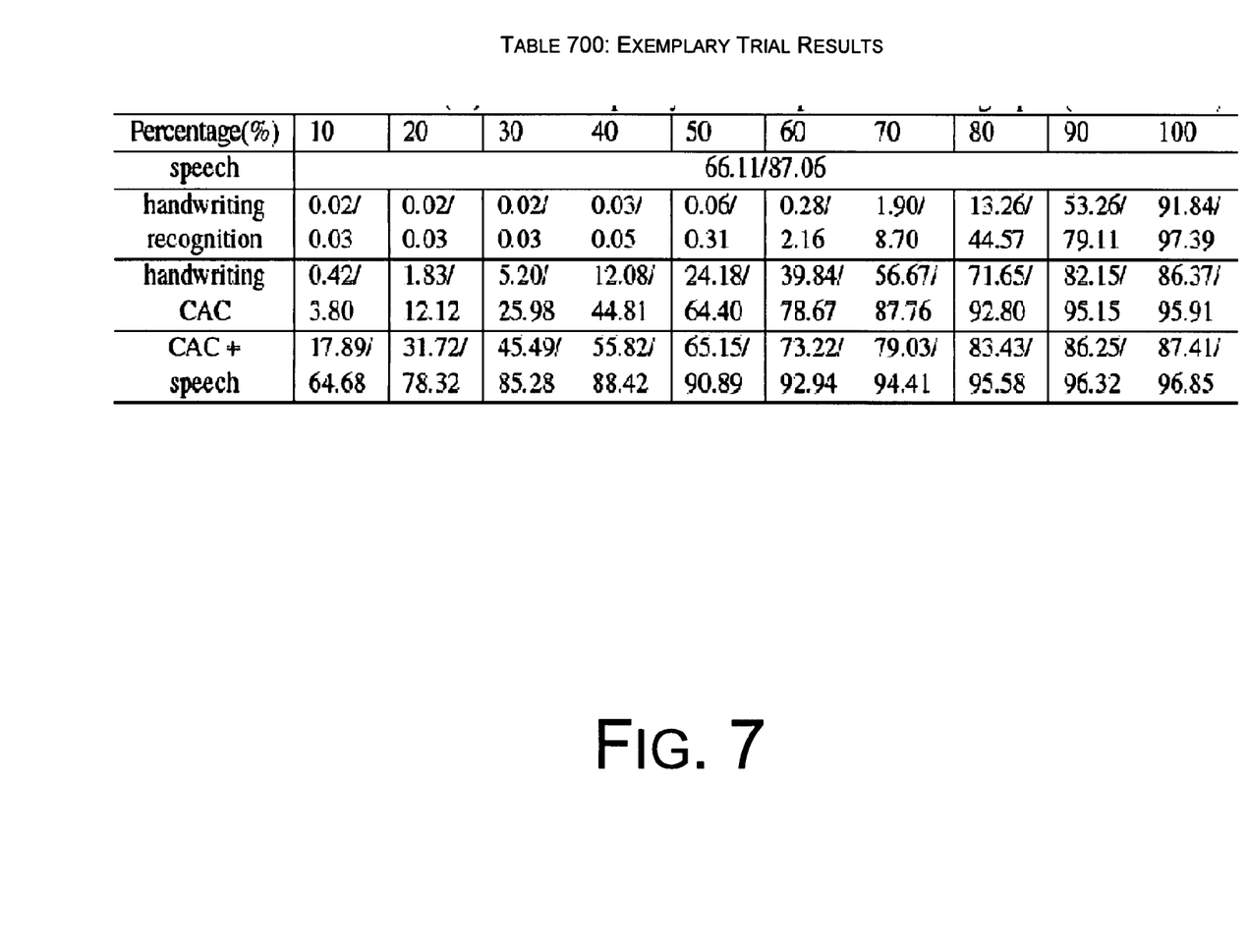
FIG. 7 is a table of results from trials using the exemplary algorithm of FIG. 4 and the exemplary method of FIG. 5.

The recognition accuracies of several systems are listed in Table 700 of FIG. 7. Speech recognition accuracy of 408 isolated syllables is not so good, but the 10-best accuracy is still decent for purposes of bi-modal fusion. On the other hand, even facing 9119 classes in cursive writing style, online handwriting recognition achieves decent performance with an exemplary modeling approach.

By comparing CAC and handwriting recognition results, it is observed that the baseline handwriting recognition system can hardly predict the input character before it is completely finished. However, the exemplary CAC algorithm of the trials dramatically improves hypotheses quality with partial handwriting input. Even without speech input, the throughput of handwriting input can be significantly accelerated because the user can stop input once the correct candidate appears in the 10-best list. With 50% of the whole character trajectory written, one can finish 64.40% of input attempts.

As described herein, an exemplary computing device includes a user interface to present a candidate list (e.g., a 10-best list) to a user. In turn, a user may select a candidate from the candidate list as being the correct candidate. Where speech input is available, the selection may occur via the user speaking the correct candidate. Where a radical or incomplete character is presented in a list, a user may optionally select the radical or incomplete character that matches the intended complete character. Such a selection may occur via actuating a button, a touch pad or voice command. Again, where available, input may occur by a user uttering the desired candidate (e.g., uttering the phone for the incomplete character, if the incomplete character corresponds to a phone).

Comparing CAC and bi-modal results, it was found that speech input was extremely helpful to further improve the input speed. The data indicated that more than 90% of character input attempts could be correctly finished with only 50% of the whole character trajectory written. It is notable that when a character is completely written, the result from handwriting recognition outperforms the other tested techniques.

As described herein, a prefix-based CAC algorithm can effectively predict character candidates based upon partial handwriting input. An exemplary algorithm has been implemented in a online decoder. The CAC candidate list can not only accelerate online handwriting input, but also fuse with speech recognition results. In an exemplary bi-modal system, more than 90% of character input attempts could be correctly finished with only 50% the character trajectory written.

As described herein, the effectiveness of bi-modal input is based upon a radical structure of Chinese characters (East Asian characters). An exemplary prefix tree based CAC algorithm can also be extended to Western language handwriting input, where the letter decomposition of a word is treated similar to the radical decomposition of Chinese characters. For example, a prefix tree may be constructed for the word "sample" where as the letters are progressively written "s, sa, sam, . . . " the tree narrows the possible end states. In general, such an approach differs from that of Chinese characters due to the hierarchical structure of Chinese characters (e.g., semantic and phonetic).

An exemplary computing device for CAC or bi-modal recognition of handwriting using a trained HMM based approach may be a cellular phone or other handheld computing device (e.g., a PDA, etc.).

Exemplary Computing Device

Figure 8:
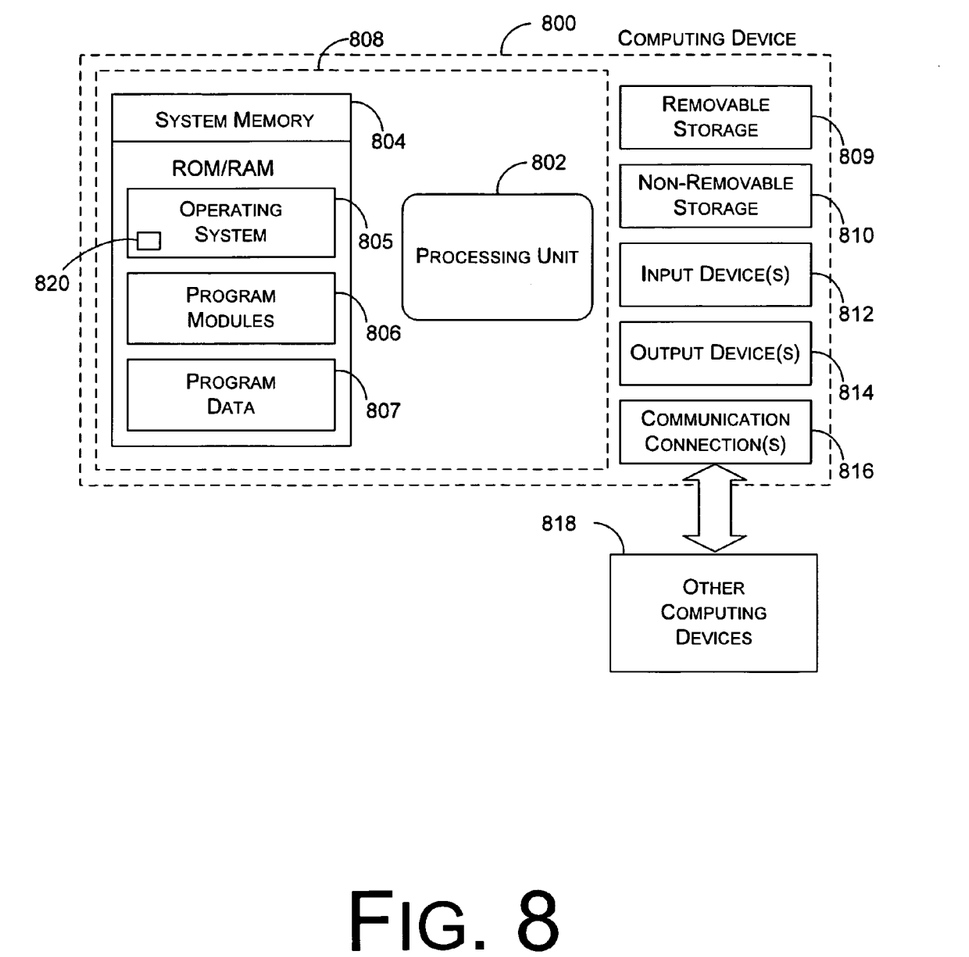
FIG. 8 is a diagram of various components of an exemplary computing device that may be used to implement part or all of various exemplary methods discussed herein.

FIG. 8 shows various components of an exemplary computing device 800 that may be used to implement part or all of various exemplary methods discussed herein.

The computing device shown in FIG. 8 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 8, an exemplary system for implementing an exemplary character generation system that uses a features-based approach to conditioning ink data includes a computing device, such as computing device 800. In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. This basic configuration is illustrated in FIG. 8 by those components within dashed line 808.

The operating system 805 may include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

Computing device 800 may also contain communication connections 816 that allow the device to communicate with other computing devices 818, such as over a network. Communication connection(s) 816 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

An exemplary computing device may include a processor, a user input mechanism (e.g., a mouse, a stylus, a scroll pad, etc.), a display and control logic implemented at least in part by the processor to recognize handwritten (and optionally spoken) characters (or word) through use of an exemplary algorithm that uses a Hidden Markov Model (HMM). Such a device may be a cellular telephone or generally a handheld computer.

As described herein, an exemplary computing device includes an input mechanism for inputting writing strokes; a display mechanism for displaying candidate characters associated with input writing strokes, the candidate characters representable by one or more radicals; a trained hidden Markov model for selecting one or more radicals based at least in part on input writing strokes; and a prefix tree for identifying one or more candidate characters based on one or more selected radicals. Such a device optionally includes a microphone and optionally includes a speaker.

As described herein one or more exemplary computer-readable storage media include computer-executable instructions for radical-based hidden Markov models to model radicals based on handwritten stroke information for character respresentable by one or more radicals; and computer-executable instructions for a prefix tree decoder that comprises radicals and characters as end states. A cell phone may include such one or more computer-readable storage media.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

The invention claimed is:

1. A method, implemented by a computing device, comprising:
receiving stroke information relating to a partially written East Asian character, the partially written East Asian character being composed of one or more radicals;
identifying the one or more radicals contained in the partially written East Asian character via one or more trained hidden Markov models;
selecting a radical in a prefix tree, wherein the prefix tree branches to East Asian characters as end states, the selecting comprising:
calculating a best partial matching score between the one or more radicals contained in the partially written East Asian character and the radical in the prefix tree; and
calculating a partial matching score for each character in the prefix tree based on the best partial matching score;
identifying an East Asian character as an end state from the prefix tree based on the partial matching score;
receiving user input to verify that the identified East Asian character is the end state for the partially written East Asian character; and
replacing the received stroke information with the identified East Asian character verified by the user input.

2. The method of claim 1 further comprising displaying the identified East Asian character.

3. The method of claim 1 wherein the stroke information comprises imaginary and real stroke information and wherein the selecting comprises selecting based on the imaginary and real stroke information.

4. The method of claim 1 further comprising receiving audio information.

5. The method of claim 4 wherein the selecting a radical comprises selecting based at least in part on the received audio information.

6. The method of claim 4 wherein the identifying the East Asian character comprises identifying based at least in part on the received audio information.

7. The method of claim 1 wherein the receiving user input comprises receiving audio information.

8. The method of claim 1 wherein the selecting comprises selecting based at least in part on slope and curvature of a pen trajectory.

9. The method of claim 1 wherein the receiving stroke information and the receiving user input occurs online.

10. The method of claim 1 wherein the selecting comprises selecting based at least in part on one or more trained hidden Markov models.

11. The method of claim 1 wherein the received stroke information corresponds to a stroke order path and wherein the selecting comprises selecting based on a multi-path model.

12. The method of claim 1 wherein the identifying the East Asian character as the end state from the prefix tree comprises identifying less than all possible end states.

13. One or more tangible computer storage media encoded with computer-executable instructions that, when executed, configure a computer system to perform the method of claim 1.

14. A computing device comprising:
   an input mechanism for inputting stroke information relating to a partially written East Asian character, the partially written East Asian character being composed of one or more radicals;
   a trained hidden Markov model for identifying the one or more radicals contained in the partially written East Asian character;
   a prefix tree for identifying an East Asian character based at least in part on the one or more radicals identified by the trained hidden Markov model, the prefix tree branches to East Asian characters as end states, the East Asian character being identified by:
      calculating a best partial matching score between the one or more radicals contained in the partially written East Asian character and a radical in the prefix tree;
      calculating a partial matching score for each character in the prefix tree based on the best partial matching score; and
      identifying the East Asian character as an end state from the prefix tree based on one or more of the partial matching scores; and
   a character-auto completing mechanism for replacing the stroke information with the identified East Asian character based at least in part on user input that verifies that the identified East Asian character is the end state for the partially written East Asian character.

15. The computing device of claim 14 further comprising a speech input mechanism.

16. A cell phone comprising one or more tangible computer storage media including instructions that, when executed, cause one or more processors to perform the method of claim 1.

17. The method of claim 1, the selecting further comprising initiating a depth first search (DFS).

18. The method of claim 1, the identifying the one or more radicals contained in the partially written East Asian character via one or more trained hidden Markov models further including employing a Multi-Space Probability Distribution (MSD).

19. One or more tangible computer-readable storage media storing computer-readable instructions that, when executed, instruct one or more processors to perform operations comprising:
   receiving stroke information relating to a partially written East Asian character, the partially written East Asian character being composed of one or more radicals;
   identifying the one or more radicals contained in the partially written East Asian character via one or more trained hidden Markov models;
   selecting a radical in a prefix tree, wherein the prefix tree branches to East Asian characters as end states, the selecting comprising:
      calculating a best partial matching score between the one or more radicals contained in the partially written East Asian character and the radical in the prefix tree; and
      calculating a partial matching score for each character in the prefix tree based on the best partial matching score;
   identifying an East Asian character as an end state from the prefix tree based on one or more of the partial matching scores;
   receiving user input to verify that the identified East Asian character is the end state for the partially written East Asian character; and
   replacing the received stroke information with the identified East Asian character verified by the user input.

20. The one or more computer-readable storage media of claim 19, wherein the operations further comprise displaying the identified East Asian character.

* * * * *